July 17, 1923.
E. J. McEACHRON
BATTERY LAMP
Filed Aug. 10, 1921
1,462,207
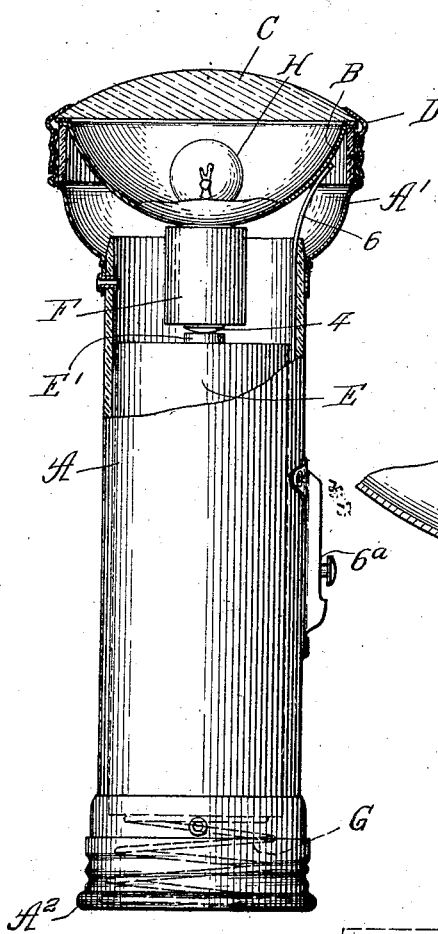
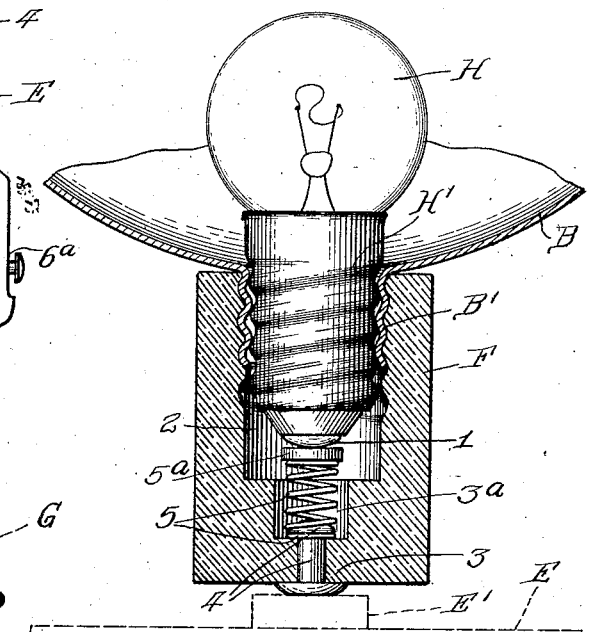
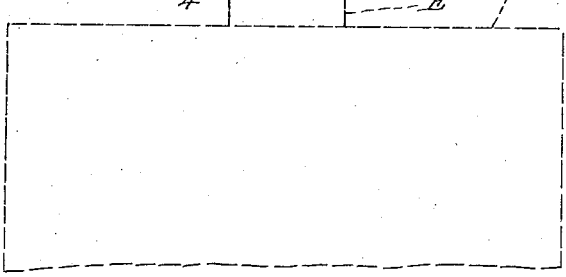

Patented July 17, 1923.

1,462,207

UNITED STATES PATENT OFFICE.

EDGAR J. McEACHRON, OF MADISON, WISCONSIN, ASSIGNOR TO FRENCH BATTERY & CARBON CO., OF MADISON, WISCONSIN, A CORPORATION OF WISCONSIN.

BATTERY LAMP.

Application filed August 10, 1921. Serial No. 491,160.

*To all whom it may concern:*

Be it known that I, EDGAR J. McEACHRON, a citizen of the United States, residing at Madison, in the county of Dane and State of Wisconsin, have invented a new and useful Improvement in Battery Lamps, of which the following is a specification.

This invention relates particularly to flashlights, lanterns or hand-lamps of the type employing a tubular casing and a dry cell or dry cells confined in said casing. In a device of this character, according to usual practice, the cell or cells are free to move somewhat in the tubular casing, the front or upper cell being pressed against the base of the lamp by means of a spring confined in the bottom of the casing.

The object of the present invention is to provide a simple and cheap device adapted to guard the lamp against shock arising from the shifting of the dry cells within the casing.

The invention is illustrated, in its preferred embodiment, in the accompanying drawing, in which—

Fig. 1 represents an elevational view of a hand-lamp equipped with the improved device, the upper portion of the hand-lamp being shown in section; and Fig. 2, an enlarged broken sectional view showing the reflector of the hand-lamp equipped with the improved shock-absorbing device, the dotted lines indicating the position of the dry cell with relation to said device.

In the construction illustrated, A represents the tubular handle or casing of the hand-lamp or flash-light, fitted at one end with a ring or annular mounting A', and fitted at the other end with a removable cap A²; B, a metallic reflector which is provided with a central tubular shank B'; C, a lens; D, a retaining ring for the lens which has threaded connection with the member A'; E, a dry cell provided with a carbon pole E'; and F, the improved shock-absorber or bumper applied to the shank B' of the reflector.

The spring which is usually employed in the base portion of the tubular member A is shown in dotted lines and is designated G.

The shank B' of the reflector preferably is provided with internal threads and external threads. Preferably, this is accomplished by spinning or pressing the metal of the shank so that a somewhat coarse thread is provided both internally and externally by the spiral corrugations formed in the metal. The lamp-bulb H has an externally threaded shank H', which screws loosely into the tubular shank B'. At the base of the lamp-shank is a central contact 1.

The member F preferably is made of insulating material, such as hard fiber, vulcanized fiber, or the like. This member preferably is a tubular member provided with a bore 2 at one end and with an end wall 3 at the other end. The member 2 is internally threaded to screw onto the shank B', as shown in Fig. 2. Thru the end wall 3 of the member F extends a central contact 4 which is adapted to bear against the carbon pole E'. This is shown as in the form of a rivet 4. The wall 3 is recessed as indicated at 3ª to receive freely a small coil spring 5 which has its inner or lower end secured to the adjacent end of the rivet 4. Secured to the outer or upper end of the spring 5 is a small disk 5ª which bears against the central contact 1 of the lamp-shank. The disk 5ª may be suitably secured to the spring in any desired manner, as by soldering.

When the parts are assembled in the manner shown in Fig. 2, the spring contact 5 or terminal with which the insulation block F is equipped presses the lamp forwardly so that it is yieldingly held against the otherwise loose fitting threads.

In use, the member F and the spring contact with which it is equipped serve effectually to prevent shocks from being transmitted from the cell or cells to the lamp-bulb, it being noted that the insulation block, or socket-member F, is securely attached to the shank of the reflector B and the reflector is, in turn, securely held on its seat by the retaining-ring D and the interposed peripheral portion of the reflector C.

The construction described is suited to use in connection with a reflector of standard type, it being usual to provide the reflector with a corrugated thread. Thus, the bumper block may be applied without changing the construction. Moreover, this form of device enables a light and comparatively long spiral spring to be used, so that the danger of the lamp being injured is reduced to a minimum.

The hand-lamp is shown provided with an internal contact member 6 which engages the metallic reflector B. This connects with a switch device 6ª by means of which the circuit may be opened and closed.

The foregoing detailed description has been given for clearness of understanding only and no unnecessary limitations should be understood therefrom, but the appended claims should be construed as broadly as permissible in view of the prior art.

What I regard as new, and desire to secure by Letters Patent, is—

1. In a battery lamp, the combination of a tubular casing, a dry cell therein, a metallic reflector mounted in one end of the casing and equipped with a central tubular shank provided with internal and external threads, a lamp-bulb in said reflector having a shank provided with a thread engaging the internal thread of said first-named shank, an insulation block having a threaded bore engaging said first-named shank and having an end wall equipped with a contact stud extending therethru, a coil spring in said bumper block electrically connected with said stud and equipped with a contact engaging the contact of the lamp-bulb, and a dry cell in said casing having its carbon pole engaging the contact afforded by said stud.

2. A shock-absorbing device adapted for attachment to the threaded shank of the reflector of a battery lamp, said device comprising a tubular insulation block having one end provided with an internally threaded bore and the other end provided with an end wall, a contact stud extending thru said end wall, and a spring contact in the bottom of said bore and connected with said stud.

3. A shock-absorbing device adapted for attachment to the threaded shank of the reflector of a battery lamp, said device comprising a tubular insulation block having one end provided with an internally threaded bore and the other end provided with an end wall which is provided centrally at its inner side with a recess, a contact stud extending through said end wall, and a coil spring contact in said recess having its lower end electrically connected to said stud and having its upper end equipped with a contact disk adapted to engage the central terminal of a lamp-bulb.

EDGAR J. McEACHRON.